United States Patent Office 2,918,448
Patented Dec. 22, 1959

2,918,448

VULCANIZATION OF BUTYL RUBBER WITH 2,2'-METHYLENE - BIS-(4-CHLORO - 6 - METHYLOL-PHENOL)

Paul Viohl, Ramsey, N.J., assignor to United States Rubber Company, New York, N.Y., a corporation of New Jersey No Drawing. Application March 11, 1957
Serial No. 644,980

7 Claims. (Cl. 260—43)

This invention relates to a new method of vulcanizing butyl rubber, namely, with 2,2'-methylene-bis-(4-chloro-6 - methylolphenol), and to the vulcanized product so formed.

It has previously been disclosed, in U.S. Patent No. 2,701,895 issued to Tawney and Little on February 15, 1955, that excellent vulcanization of butyl rubber can be effected by 2,6-dimethylol-4-hydrocarbyl phenols and their self-condensation products. Such improved method of vulcanizing or curing butyl rubber is particularly valuable when accelerated by heavy metal halides, as disclosed in U.S. Patent No. 2,726,224 issued to Peterson and Batts on December 6, 1955.

However, it has been desired to provide an improved method of vulcanizing butyl rubber which would proceed sufficiently rapidly to make the use of an accelerator unnecessary.

I have now found, unexpectedly, that butyl rubber can be cured or vulcanized rapidly to yield a vulcanizate having an unusual combination of desirable properties, by heating the butyl rubber in admixture with 2,2'-methylene-bis-(4-chloro-6-methylolphenol). Perhaps the most useful and surprising aspect of the improved vulcanizate thus obtained lies in the fact that textile materials laminated with the present vulcanizate or similarly embedded in the vulcanizate do not suffer undue tenderizing. The invention is therefore especially adapted to the manufacture of pneumatic tires from butyl rubber reinforced with textile material, whether a natural textile material such as cotton or a synthetic textile material such as rayon or nylon. Pneumatic tires comprising textile reinforcement in combination with a butyl rubber vulcanizate in which the vulcanizing agent is 2,2'-methylene-bis-(4-chloro-6-methylolphenol) are remarkable with respect to the absence of any undue tenderizing effect on the textile reinforcement, such as is encountered when highly acidic substances such as metal halides are present during the vulcanization. The vulcanizates of the invention are further remarkable for the "tightness" of cure, obtainable in a relatively short curing time under relatively moderate curing conditions, as well as for the remarkable resistance of the vulcanizates to deterioration on aging, under the influence of such destructive agencies as heat, steam, oxygen and ozone.

The term "butyl rubber" is used herein in its conventional sense to refer to that known class of synthetic rubbers typically made by low temperature copolymerization of an isoolefin with a minor amount of a multiolefinic unsaturate. The isoolefins used generally have from 4 to 7 carbon atoms, and such isomonoolefins as isobutylene and 2-methyl-2-butene are preferred. The multiolefinic unsaturate is generally a conjugated diolefin, usually one having from 4 to 8 carbon atoms. Isoprene and butadiene are the most important of these diolefins; others are piperylene, 2,3-dimethylbutadiene, 3-methyl-1,3-pentadiene, 2-methyl-1,3-pentadiene, 1,3- hexadiene and 2,4-hexadiene. The butyl rubber usually contains from about 0.5 to 10% of copolymerized diolefin. The basic copolymer may be modified, if desired, either by including other copolymerizable materials in the original preparation of the copolymer, or by treating the previously prepared copolymer with reactive reagents. Thus, the rubbery copolymer of an isoolefin, such as isobutylene, containing 0.5 to 10% of copolymerized diolefin, such as isoprene, may be modified by replacing more or less of the non-chlorinated diolefin (e.g., isoprene) by a chlorinated diolefin (e.g., chloroprene), or the non-chlorinated diolefin may be supplemented by chlorinated diolefin, in the preparation of the copolymer. Similarly, other modifying monomers, such as allyl chloride or methallyl chloride, may be present during the preparation of the copolymer. The final copolymer usually contains from 0.5 to 10% of the diolefinically unsaturated material, but the content of isoolefin may vary from 80 to 99.5%, depending on whether additional monomers are present. If there is no additional modifying comonomer present, the isoolefin content usually amounts to from 90 to 99.5%. Alternatively, the copolymer may be modified by subjecting the previously prepared copolymer to the action of halogens, usually chlorine or bromine, to produce a modified copolymer containing, for example, 0.2 to 10% of chlorine or bromine (see, for example, U.S. Patents 2,732,354, Morrissey et al., January 24, 1956; 2,631,984, Crawford et al., March 17, 1953; 2,700,997, Morrissey et al., February 1, 1955; and 2,720,479, Crawford et al., October 11, 1955). Examples of commercially available rubbery copolymers of an isoolefin with 0.5 to 10% of a diolefin include "GR–I 15," "Enjay Butyl B–11" (the latter being a modified copolymer containing chlorine) and "Hycar 2202" (the latter being a modified copolymer containing bromine). Hence, the expressions "butyl rubber," or "rubbery copolymer of an isoolefin with from 0.5 to 10% of a diolefin," or similar expressions, as used herein therefore contemplate the various known modified forms of the butyl rubber copolymer, as well as the unmodified copolymer.

Butyl rubber differs markedly, in its behavior toward vulcanizing agents, from the typically highly unsaturated rubbers, such as Hevea rubber or such synthetic rubbers as GR–S (butadiene-styrene copolymer) or GR–A (butadiene-acrylonitrile copolymer), which are in general much more readily vulcanizable. The vulcanization of butyl rubber has always presented a special problem, and although it is possible to vulcanize butyl rubber with sulfur and conventional accelerators, such sulfur vulcanization has not been entirely satisfactory for many purposes, and hence the continuing search for improved ways of curing butyl rubber.

The 2,2′-methylene-bis-(4-chloro-6-methylolphenol) employed as the vulcanizing agent for butyl rubber in the present invention is a known material [Zinke and Hanus, Ber. 74B, 211–212 (1941)], and can be made as follows (all parts and percentages being by weight):

A clear solution is made by mixing together in the order shown with stirring 4880 parts of water, 410 parts of sodium hydroxide (assay 97%), 2690 parts of 2,2′-methylene-bis-(4-chlorophenol) (known commercially as "dichlorophene") and 1780 parts of formalin. This solution is heated at about 50° C. for about 22 hours and then is cooled to room temperature. Some of the sodium salt of the product precipitates. More is precipitated by adding 580 parts of sodium chloride to the rapidly stirred mixture. After a short time the mixture is filtered, the filter cake is slurried with water and refiltered. The second filter cake is rapidly agitated with 3000 parts of water at 50–55° C. and acidified with 20% acetic acid to a pH of 3.5 to 4.0 to form 2,2′-methylene-bis-(4-chloro-6-methylolphenol) as a very pale creme colored solid. It is filtered, washed three times by slurrying it in water and filtering, and dried in air. It melts at 138–140° C. with decomposition. (The melting point varies considerably from batch to batch of product, perhaps because of variations in the purity of the dichlorophene or because of sensitivity of the product to minor variations in the way of taking the melting point. Sometimes, a melting point—or decomposition point—as high as 155° C. has been observed. Therefore, analysis of the product is a much more reliable test for purity than is the melting point.)

ANALYSIS

|  | Calcd. for $C_{15}H_{14}O_4Cl_2$ | Found |
|---|---|---|
|  | Percent | Percent |
| Carbon | 54.7 | 56.0 |
| Hydrogen | 4.3 | 4.3 |
| Chlorine | 21.5 | 21.3 |
| Methylol | 18.8 | 18.0 |

In accordance with the invention, the butyl rubber (in which category I include all of the unmodified or modified isoolefin-diolefin copolymers referred to above) is mixed in any suitable conventional manner (such as by working the rubber on an open roll mill or in an internal mixer) with a small but effective amount of 2,2′-methylene-bis-(4-chloro-6-methylolphenol), sufficient to produce the desired level of cure. The desired level of cure may range all the way from a slight pre-cure (as disclosed, for example, in U.S. Patents 2,702,286–7 issued to Iknayan et al. on February 15, 1955, or U.S. Patent 2,756,801 issued to Iknayan et al. on July 31, 1956) to a complete or true vulcanization. The slight pre-cure may be carried out for various purposes, such as to improve processing or to improve the dispersion of carbon black, silica or other fillers in the butyl rubber, or to lower the hysteresis of such butyl rubber-filler mixtures (when subsequently vulcanized), or to render the butyl rubber more compatible with oil or with other rubbers, or to provide a plastic puncture-sealing material for pneumatic tires or tubes, all as disclosed in the patents just referred to. Such slight pre-cure can be effected with very small amounts of the curing agent of the invention, vis., 2,2′-methylene-bis-(4-chloro-6-methylolphenol), usually less than 2 parts by weight (e.g. about 0.25 to about 1.9 parts) per 100 parts of the butyl rubber. It will be understood that such slight pre-cure, or "scorching," is accomplished by heating the mixture of butyl rubber and the present curing agent in the amount specified, along with any other desired ingredients, to a temperature sufficient to cause reaction (viz., slight vulcanization) between the butyl rubber and the present curing agent. Temperatures ranging from about 125° C. to about 200° C. are usually suitable, and it is frequently preferred to masticate the mixture during such pre-cure. Subsequently the pre-cured mix may be completely vulcanized if desired, using either a further quantity of the vulcanizing agent of the invention, or any conventional vulcanizing agent for butyl rubber (e.g., sulfur and/or sulfur-donating accelerators, dinitrosobenzene, quinone dioxime, dimethylol-phenols, etc.), usually in amount of from 2 to 15 parts.

The more typical practice of the invention involves the substantially complete cure of the butyl rubber by the 2,2′-methylene-bis-(4-chloro-6-methylolphenol) to yield directly a strong, elastic, and resilient body useful for curing bags, steam hose, conveyor belts, pneumatic tires, rubber mountings, fuel cells, protective clothing, and similar articles. For this purpose I usually employ at least about 2 parts of the present curing agent per 100 parts of butyl rubber, usually from about 2 parts to about 15 parts, and preferably from about 4 to about 12 parts. The vulcanization is brought about, as indicated previously, by heating the mixture, to a temperature of, for example, from about 125° C. to about 200° C. The time required to substantially complete the cure will vary widely in practice, depending on such variables as the quantity of the present curing agent employed, the temperature at which the process is carried out, the size of the article being cured, the type of apparatus employed, etc. In general, it may be stated that satisfactory cures may be obtained within curing times ranging between about 2 minutes to 8 hours. It will be understood that the time required will in general be inversely related to the quantity of the present vulcanizing agent contained in the mixture, and will also be inversely related to the temperature existing during the cure.

Other modifying or compounding ingredients may be present in the mixture of butyl rubber and the present vulcanizing agent, if desired. Thus, fillers such as carbon black, clays, hydrated silica, whiting, or the like, may be present, as well as pigments and dyes, mold release agents, blowing agents, softeners or plasticizers, tackifying agents, etc.

The vulcanization may be carried out in a closed mold under suitable pressure (as, for example, in the case of pneumatic tires or curing bags), or it may be carried out in an oven in air or any other suitable atmosphere (as in the case of gloves or footwear). The vulcanizable composition may be calendered or otherwise applied to fabric (e.g., tire cord fabric) to make laminated articles such as pneumatic tires or air springs.

If desired, the vulcanization of the invention may be preceded by a slight pre-curing of the butyl rubber, for any of the purposes previously referred to, such pre-curing being effected either by the present curing agent or by any suitable conventional curing agent (e.g., sulfur or sulfur-donating accelerators, dinitrosobenzene, quinone dioxime, dimethylol phenols, etc., usually in amount of from 0.25 to 1.9 parts). The present vulcanizates, especially if the foregoing pre-cure has been carried out (and more especially if the present curing agent or a dimethylol phenol has been used in the pre-cure), are frequently characterized by unusually low hysteresis, and freedom from "sponging" (as illustrated by improved results in the St. Joe flexometer test).

The following examples, in which all parts and percentages are by weight, will serve to illustrate the practice of the invention in more detail.

Example 1

A mixture of 100 parts of the vulcanizing agent of the invention, viz., 2,2'-methylene-bis-(4-chloro-6-methylolphenol), 75 parts of paraffinic oil and 25 parts of Laurex (crude zinc laurate) is ground to a fine paste in a paint mill. (This paste was made merely for the purpose of dispersing the powdered vulcanizing agent more easily in the butyl rubber. The vulcanizing agent could have been employed as such without the zinc laurate with equivalent results, or other conventional methods of dispersing the vulcanizing agent could have been used with equivalent results.)

A masterbatch was mixed on a rubber mill in the proportion of 100 parts of a commercially available kind of butyl rubber known as GR–I 15 (a copolymer of isobutylene: isoprene, 98:2, according to Rubber Age, 74, 561 (1954)) and 50 parts of carbon black. Portions of the paste and—except for stock #4—additional Laurex and paraffinic oil were then mixed with individual portions of the masterbatch on the mill to form a series of stocks which differed among themselves only in the amount of the curing agent. Portions of these stocks were cured in 6" x 6" x 0.1" molds under pressure under the temperature and time conditions shown individually. The stocks were cooled to room temperature and then were tested conventionally, as shown, to determine the extent of cure.

| Stock | | 1 | 2 | 3 | 4 |
|---|---|---|---|---|---|
| Butyl Rubber Masterbatch | | 150 | 150 | 150 | 150 |
| Curing Paste Containing 2,2'-Methylene-bis-(4-chloro-6-methylolphenol) | | 4 | 8 | 12 | 20 |
| Laurex | | 2 | 1.5 | 1 | |
| Paraffinic Oil | | 6 | 4.5 | 3 | |
| Physical Properties: | | | | | |
| A. Cure at 153° C.— | Time of Cure (Min.) | | | | |
| Tensile Strength (p.s.i.) | 30 | 260 | 650 | 960 | 1,180 |
|  | 60 | 260 | 920 | 1,260 | 1,530 |
|  | 120 | 390 | 1,160 | 1,520 | 1,710 |
|  | 240 | 530 | 1,290 | 1,660 | 1,750 |
| Elongation (percent) | 30 | 500 | 610 | 550 | 520 |
|  | 60 | 590 | 520 | 450 | 420 |
|  | 120 | 560 | 440 | 390 | 310 |
|  | 240 | 570 | 390 | 350 | 280 |
| 300% Modulus (p.s.i.) | 30 | 150 | 340 | 470 | 600 |
|  | 60 | 190 | 520 | 750 | 990 |
|  | 120 | 230 | 700 | 1,000 | 1,330 |
|  | 240 | 320 | 880 | 1,260 | 1,630 |
| B. Cure at 145° C.— | | | | | |
| Tensile Strength (p.s.i.) | 60 | 240 | 690 | 1,080 | 1,260 |
|  | 120 | 310 | 980 | 1,340 | 1,670 |
|  | 240 | 390 | 1,220 | 1,630 | 1,830 |
| Elongation (percent) | 60 | 480 | 620 | 510 | 480 |
|  | 120 | 550 | 480 | 410 | 400 |
|  | 240 | 580 | 410 | 370 | 340 |
| 300% Modulus (p.s.i.) | 60 | 160 | 370 | 530 | 670 |
|  | 120 | 200 | 560 | 880 | 1,080 |
|  | 240 | 270 | 770 | 1,130 | 1,460 |

This example shows that 2,2'-methylene-bis-(4-chloro-6-methylolphenol) cures butyl rubber in the absence of an accelerator. All of these stocks illustrate the invention. In place of GR–15, "Enjay B–11" (chlorinated butyl rubber) or "Hycar 2202" (brominated butyl rubber) may be used in the same manner with similar results.

Example 2

The purpose of this example is to compare the curing action of the present agent to that of the prior art phenolic curing materials, with and without an accelerator (i.e., a metal halide, viz., stannous chloride).

The following stocks were mixed, cured and tested as shown in Example 1.

| Stock | | 3 | 5 | 6 | 7 |
|---|---|---|---|---|---|
| Butyl Rubber Masterbatch [a] | | 150 | 150 | 150 | 150 |
| Curing Paste Containing 2,2'-Methylene-bis-(4-chloro-6-methylophenol) [a] | | 12 | 12 | | |
| Laurex | | 1 | 1 | 2.5 | 2.5 |
| Paraffinic Oil | | 3 | 3 | 7.5 | 7.5 |
| Super Beckacite 1001 (conventional phenolic curing agent) [b] | | | | 6 | 6 |
| SnCl₂.2H₂O (Accelerator) | | | 2 | | 2 |
| Physical Properties: | | | | | |
| A. Cure at 153° C.— | Time of Cure (Min.) | | | | |
| Tensile Strength (p.s.i.) | 30 | 960 | 1,100 | 720 | 1,390 |
|  | 60 | 1,260 | 1,470 | 1,210 | 1,490 |
|  | 120 | 1,520 | 1,580 | 1,530 | 1,600 |
|  | 240 | 1,660 | 1,550 | 1,650 | 1,610 |
| Elongation (percent) | 30 | 550 | 450 | 1,010 | 560 |
|  | 60 | 450 | 390 | 710 | 510 |
|  | 120 | 390 | 330 | 590 | 470 |
|  | 240 | 350 | 280 | 520 | 430 |
| 300% Modulus (p.s.i.) | 30 | 470 | 610 | 180 | 610 |
|  | 60 | 750 | 940 | 380 | 730 |
|  | 120 | 1,000 | 1,190 | 630 | 840 |
|  | 240 | 1,260 | | 800 | 950 |
| B. Cure at 145° C.— | | | | | |
| Tensile Strength (p.s.i.) | 60 | 1,080 | 1,150 | 750 | 1,510 |
|  | 120 | 1,340 | 1,340 | 1,270 | 1,620 |
|  | 240 | 1,630 | 1,470 | 1,600 | 1,610 |
| Elongation (percent) | 60 | 510 | 490 | 930 | 540 |
|  | 120 | 410 | 370 | 670 | 480 |
|  | 240 | 370 | 320 | 610 | 460 |
| 300% Modulus (p.s.i.) | 60 | 530 | 630 | 200 | 670 |
|  | 120 | 880 | 930 | 430 | 820 |
|  | 240 | 1,130 | 1,210 | 680 | 910 |

[a] Shown in Example 1.
[b] Said to be a self-condensation product of 2,6-dimethylol-4-tert.butylphenol, i.e., a resole made from 4-tert.butylphenol and formaldehyde in the presence of sodium hydroxide. This is a conventional curative for butyl rubber, as disclosed in the patents referred to previously.

This example brings out several important differences between this invention, as typified by stock #3, and prior methods, of curing butyl rubber with phenolic compounds, as typified by stocks #6–7.

(1) Comparison between stock #3 (which illustrates the invention) and stock #6 (which illustrates the teaching of Tawney and Little, U.S. 2,701,895) shows that my new curing agent is much faster than one of the best of the prior phenolic curing agents for butyl rubber when the latter agent is unaccelerated.

(2) Comparison between stocks #3 and #7 (which illustrates the teaching of Peterson and Batts, U.S. 2,726,224) shows that my new curing agent is as fast when unaccelerated as one of the best of the prior phenolic curing agents when accelerated by one of the most active agents known to the art.

(3) Comparison between stocks #3 and #5 shows that the curing agent of the invention produces optimum results even in the absence of the stannous chloride accelerator.

Thus, it is evident that my new curing agent behaves very differently from the agents disclosed by Tawney and Little and by Peterson and Batts, and is markedly superior by reason of the fact that good cures are achieved rapidly without any necessity for using an accelerator.

Example 3

The purpose of this example is to highlight the criticality of the selection of the present curing agent. The present curing agent, 2,2'-methylene-bis-(4-chloro-6-methylolphenol), has the following structural formula:

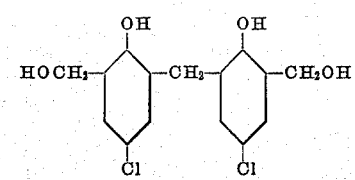

I

A substance closely related chemically to the present curing agent is 2,6-dimethylol-4-chlorophenol, which has the formula:

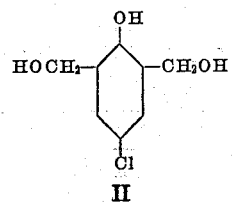

II

It will be observed that the vulcanizing agent I of the invention is quite similar to the chemical II, but, as will be demonstrated in this example, the chemical II has no practical utility as a vulcanizing agent for butyl rubber. This appears to be in direct contradiction to the behavior of chemical II in natural (Hevea) rubber, since 2,6-dimethylol-3-chlorophenol is reported by Van der Meer [Rubber Chem. Tech., 18, 856 (1945)] as a curative for Hevea rubber. This also serves to emphasize further the fundamental differences in vulcanizing behavior of butyl rubber and the highly unsaturated rubbers.

The following stocks were mixed, cured at 153° C. and tested as shown in Example 1.

| Stock | | 8 | 9 |
|---|---|---|---|
| Butyl Rubber Masterbatch a | | 150 | 150 |
| Curing Paste Containing 2,2'-Methylene-bis-(4-chloro-6-methylolphenol) a | | 12 | |
| 2,6-Dimethylol-4-chlorophenol | | | 6 |
| Paraffinic Oil | | | 4.5 |
| Laurex | | | 1.5 |
| Physical Properties: | Time of Cure (Min.) | | |
| Tensile Strength (p.s.i.) | 15 | 720 | 80 |
|  | 30 | 1,150 | 110 |
|  | 60 | 1,580 | 190 |
|  | 120 | 1,610 | 390 |
| Elongation (percent) | 15 | 470 | 660 |
|  | 30 | 350 | 370 |
|  | 60 | 300 | 519 |
|  | 120 | 240 | 500 |
| 200% Modulus (p.s.i.) | 15 | 280 | 40 |
|  | 30 | 480 | 60 |
|  | 60 | 750 | 110 |
|  | 120 | 1,000 | 200 | a Described in Example 1.

The foregoing data show that chemical II, 2,6-dimethylol-4-chlorophenol, used in stock #9, is not a practical curative for butyl rubber, since the physical properties achieved in this stock are very poor indeed, in direct contrast to the excellent vulcanizing effect observed in stock #8, which utilized chemical I, the vulcanizing agent of the invention. To further emphasize the comparative ineffectiveness of the 2,6-dimethylol-4-chlorophenol as a vulcanizing agent for butyl rubber, another stock was prepared, similar to stock #9, but containing additionally 1.8 parts of a powerful accelerator (SnCl$_2$.2H$_2$O). Even with such an accelerator present, poor physical properties, indicative of unacceptable curing action, were obtained.

*Example 4*

This example illustrates the practice of the invention with a non-black filler, and at the same time it illustrates the use of a slight pre-cure (effected by a conventional curative, viz., a 2,6-dimethylol-4-hydrocarbylphenol self-condensation product). Subsequent to such pre-cure or "scorching", the thus-treated butyl rubber was compounded with the curative of the invention, and subjected to a complete vulcanization. For comparison, a further portion of the precured material was vulcanized with the conventional phenolic curative.

A masterbatch was mixed in a Banbury mixer in the proportion of 100 parts of GR–I 15, 55 parts of Hi-Sil 233 (finely-divided hydrated silica) and one part of Super Beckacite 1001. This masterbatch then was masticated in the Banbury for 10 minutes at 375° F. by the method of Iknayan et al., U.S. 2,702,287.

The following stocks were mixed, utilizing the foregoing pre-treated masterbatch, cured at 153° C. and tested as shown in Example 1.

| Stock | | 10 | 11 |
|---|---|---|---|
| Butyl Rubber Hi-Sil Masterbatch (pre-treated) | | 156 | 156 |
| Curing Paste Containing 2,2'-Methylene-bis-(4-chloro-6-methylolphenol) a | | 12 | |
| Laurex | | | 1.5 |
| Paraffinic Oil | | | 4.5 |
| Super Beckacite 1001 (Conventional phenolic curative) | | | 6 |
| Physical Properties: | Time of Cure (Min.) | | |
| Tensile Strength (p.s.i.) | 30 | 850 | 210 |
|  | 60 | 1,000 | 530 |
|  | 120 | 1,160 | 850 |
|  | 240 | 1,300 | 1,010 |
| Elongation (percent) | 30 | 390 | 1,140 |
|  | 60 | 370 | 760 |
|  | 120 | 330 | 650 |
|  | 240 | 320 | 590 |
| 300% Modulus (p.s.i.) | 30 | 590 | 100 |
|  | 60 | 770 | 200 |
|  | 120 | 970 | 340 |
|  | 240 | 1,110 | 410 | a Shown in Example 1.

From the foregoing data it will be evident that the heat treated material subsequently vulcanized in accordance with the invention (stock #10) was far superior to the similarly heat treated but conventionally vulcanized material (stock #11). Further stocks similar to stocks #10 and #11 were prepared, but differing in that 2 parts of SnCl$_2$.H$_2$O was included as an accelerator. The stock of the invention retained its high quality level, and the stock containing the conventional curative was improved appreciably, but was still inferior to the stock of the invention (with or without the accelerator). This serves to emphasize the ability of the present curative to achieve its optimum results without resorting to the use of an accelerator in contrast to the conventional phenolic curative, which requires an accelerator to achieve its best results under comparable curing conditions.

*Example 5*

The importance of the fact that the present 2,2'-methylene-bis-(4-chloro-6-methylolphenol) curative is capable of achieving its optimum results without resort to the use of an accelerator lies not only in the fact that the process is thereby made simpler and more convenient, but it also lies in the fact that the present curing system is thereby enabled to avoid undue tenderizing of textile reinforcement assembled with the vulcanizate, as intimated previously. This example illustrates the latter important advantage.

The following stocks were mixed on a cool rubber mill, then were calendered to a thickness of about $\frac{1}{16}$", and were cut into square pieces about 14" x 14". Six cords of a particular textile material were laid, under slight tension, parallel to each other and almost touching each other, on one piece of each stock. A piece of thin aluminum foil just slightly wider and longer than the group of six cords was rolled onto the cords. Finally, a second piece of the same stock was rolled over the aluminum. The cords and foil were positioned so that they were entirely sealed within the rubber. These "sandwiches" then were cured in molds under pressure for 60 minutes at 153° C., and were cooled to room temperature. One sandwich of each stock and each textile material was set aside for "green" (i.e., unaged) testing. All of the rest were aged at 149° C., in a circulating air oven for the times shown. Next all of the stocks, including the green ones, were trimmed at room temperature until the edges of the foil were exposed. It was then easy to remove the top rubber layer from the foil, peel the foil from the bottom layer and expose the cords. Unless the cords were almost totally deteriorated they could be removed easily from the rubber without damaging them. During the cure and aging about 75% of the circumference of each cord was in contact with the rubber, and the rest of the circumference was in contact with the aluminum. Finally, the breaking strength of each cord was measured with a conventional Scott inclined plane tester. The figures given below are the averages of five individual tests.

| Stock | 12 | | 13 | |
|---|---|---|---|---|
| Butyl Rubber (GR-I 15) | 100 | | 100 | |
| Carbon Black | 50 | | 50 | |
| Plasticizer | 2 | | 2 | |
| 2,2' - Methylene - bis - (4 - chloro-6-methylolphenol)* | 6 | | -- | |
| Super Beckacite 1001 (Conventional phenolic Curing Agent) | -- | | 4 | |
| $SnCl_2 \cdot 2H_2O$ (Accelerator) | -- | | 1.8 | |
| Nylon 66 Cord: | Strength | | Strength | |
| | Lbs. | Percent of Orig. | Lbs. | Percent of Orig. |
| Original Cord | 27.5 | 100 | 27.5 | 100 |
| After cure— | | | | |
| green | 24.1 | 87.6 | 27.0 | 98.2 |
| aged 1 hr | not tested | | 23.1 | 84.0 |
| aged 12 hrs | 24.6 | 89.5 | 6.5 | 23.6 |
| aged 24 hrs | 24.5 | 89.2 | 5.8 | 21.1 |
| aged 48 hrs | 23.6 | 85.8 | 2.8 | 10.2 |
| aged 72 hrs | 23.5 | 85.5 | 2.8 | 10.2 |
| aged 144 hrs | 23.8 | 86.5 | charred | 0 |
| Rayon Cord: | | | | |
| Original Cord | 29.4 | 100 | 29.4 | 100 |
| After cure— | | | | |
| green | 28.7 | 97.6 | 23.0 | 78.2 |
| aged 1 hr | not tested | | 10.9 | 40 |
| aged 12 hrs | 24.2 | 82.3 | charred | 0 |
| aged 24 hrs | 19.8 | 67.3 | charred | 0 |
| aged 48 hrs | 16.1 | 54.8 | charred | 0 |
| aged 72 hrs | 13.5 | 45.9 | charred | 0 |
| aged 144 hrs | 12.9 | 43.9 | charred | 0 |
| Cotton Cord: | | | | |
| Original Cord | 16.9 | 100 | 16.9 | 100 |
| After cure— | | | | |
| green | 15.3 | 90.5 | 17.0 | 100.6 |
| aged 1 hr | not tested | | 7.5 | 44.4 |
| aged 12 hrs | 13.0 | 76.9 | charred | 0 |
| aged 24 hrs | 12.7 | 75.1 | charred | 0 |
| aged 48 hrs | 11.6 | 68.6 | charred | 0 |
| aged 72 hrs | 9.5 | 56.2 | charred | 0 |
| aged 144 hrs | 8.4 | 49.7 | charred | 0 |

* Ground to a very fine powder and mixed directly with the butyl rubber.

This example shows the very great difference between my curing agent (stock #12) and a conventional phenolic curing agent which needs an accelerator to effect comparably rapid cure (stock #13) in their effect on textile materials. Nylon has retained almost all of its original strength after long aging in contact with a stock illustrating my invention, whereas the conventional stock caused the nylon to lose strength rapidly and finally to become charred, i.e., to lose all its strength. Viscose rayon and cotton retained about half their original strength on long aging against my new stock, whereas they were completely ruined by even a few hours contact with the conventional stock. This shows the unexpected and extremely beneficial effect of my new curing agent as contrasted with a conventional phenolic curing agent: accelerator combination.

The practical significance of the results obtained under the foregoing aging conditions of greatly aggravated severity is that a composite article, such as a textile-reinforce pneumatic tire, would provide a much longer service life without failure of the textile from tenderizing when the vulcanizing agent of the invention was used, in contrast to the probable early failure of a similar tire vulcanized with the conventional phenolic curing agent-accelerator combination.

Having thus described by invention, what I claim and desire to protect by Letters Patent is:

1. A method comprising heating 100 parts of a rubbery copolymer of an isoolefin having from 4 to 7 carbon atoms with a diolefin having from 4 to 8 carbon atoms, the said copolymer containing from 0.5 to 10% of said diolefin, in admixture with from 0.25 to 15 parts of 2,2'-methylene-bis-(4-chloro-6-methylolphenol) at a temperature of from 125° to 200° C., for a period of from 2 minutes to 8 hours.

2. A method of vulcanizing a rubbery copolymer of isobutylene and isoprene, said copolymer containing from 0.5 to 10% of isoprene, comprising heating 100 parts of said rubbery copolymer in admixture with from 4 to 12 parts of 2,2'-methylene-bis-(4-chloro-6-methylolphenol) at a temperature of from 125° to 200° C. for a period of from 2 minutes to 8 hours.

3. A vulcanizate comprising 100 parts of a rubbery copolymer of an isoolefin having from 4 to 7 carbon atoms with a diolefin having from 4 to 8 carbon atoms, the said copolymer containing from 0.5 to 10% of said diolefin, and from 2 to 15 parts of 2,2'-methylene-bis-(4-chloro-6-methylolphenol).

4. A vulcanizate as in claim 3, containing textile reinforcement.

5. A vulcanizate comprising 100 parts of a rubbery copolymer of isobutylene with isoprene, the said copolymer containing from 0.5 to 10% of isoprene, and from 4 to 12 parts of 2,2'-methylene-bis-(4-chloro-6-methylolphenol).

6. A vulcanizate as in claim 5, containing textile reinforcement.

7. A reaction product comprising 100 parts of a rubbery copolymer of an isoolefin having from 4 to 7 carbon atoms with a diolefin having from 4 to 8 carbon atoms, the said copolymer containing from 0.5 to 10% of said diolefin, and from 0.25 to 1.9 parts of 2,2'-methylene-bis-(4-chloro-6-methylolphenol).

References Cited in the file of this patent

UNITED STATES PATENTS

| 2,702,287 | Iknayan et al. | Feb. 15, 1955 |

FOREIGN PATENTS

| 676,456 | France | Nov. 28, 1929 |
| 48,977 | France | June 28, 1938 |

(Addition to No. 804,552)